Feb. 1, 1949.  L. S. LONGENECKER  2,460,514
GLASS MELTING FURNACE
Filed Nov. 2, 1945  2 Sheets-Sheet 1

INVENTOR
Levi S. Longenecker
By Green & McCallister
His Attorneys

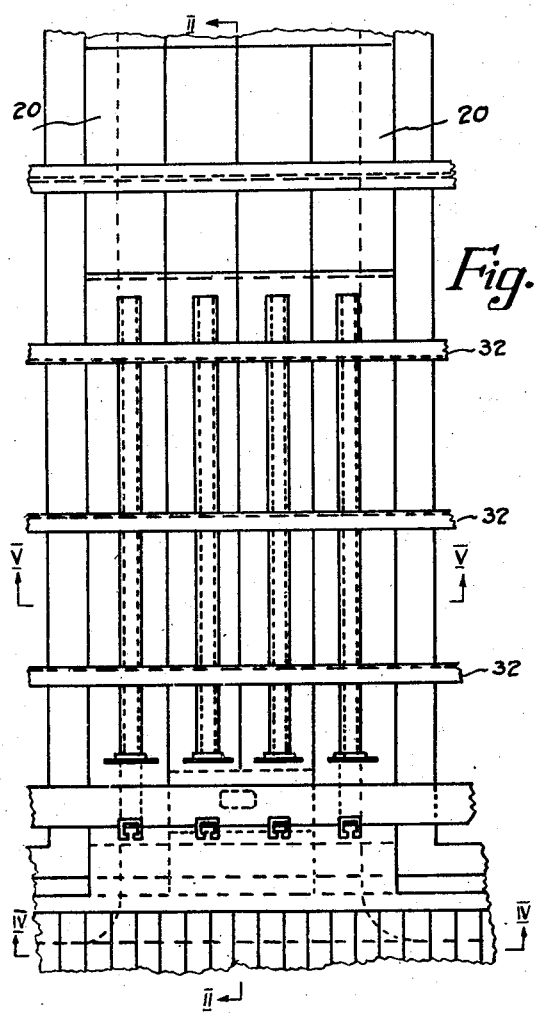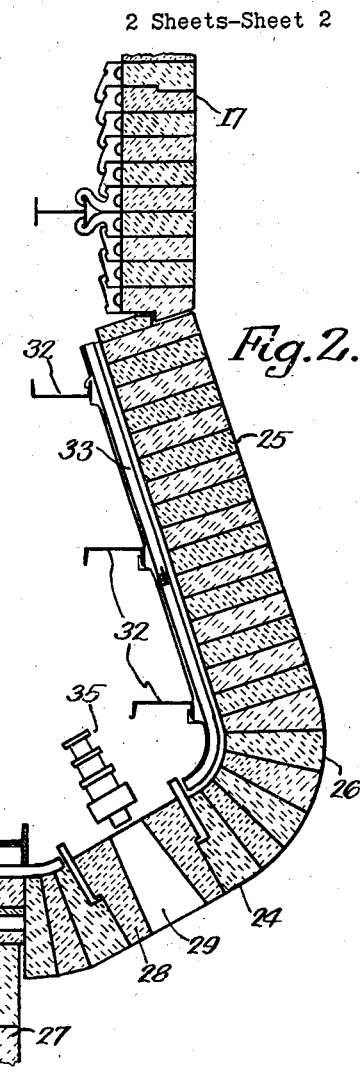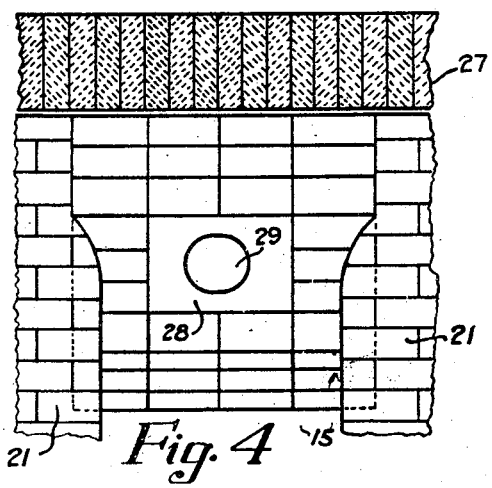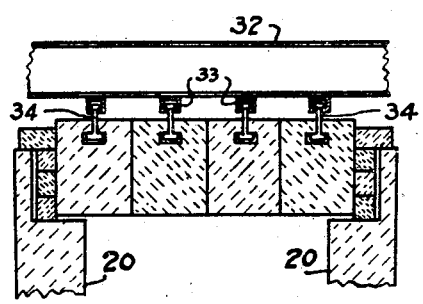

Patented Feb. 1, 1949

2,460,514

UNITED STATES PATENT OFFICE 2,460,514

GLASS MELTING FURNACE

Levi S. Longenecker, Mount Lebanon, Pa.

Application November 2, 1945, Serial No. 626,299

8 Claims. (Cl. 49—54)

This invention relates to regenerative tank type glass melting furnaces and to the port structure of such furnaces.

The present day port structures of glass melting furnaces of the type referred to are not satisfactory when liquid fuel delivered at relatively high nozzle velocities is used.

So far as I know, all installations prior to this invention in which high velocity liquid fuel is introduced into the incoming air stream from a point adjacent that at which such stream enters the furnace chamber, are open to serious objections.

If the fuel is introduced through a burner block located in the roof or arch of the furnace chamber, the fuel jet, in order to meet the air stream anywhere near the port mouth, must be directed at such an angle with relation to the axis of the air stream that the high velocity fuel jet bores through such stream and splashes off the surface of the glass causing high turbulance which results in a local hot spot adjacent the port mouth. This prevents uniform flame coverage across the tank from port to port.

If the arrangement is such that the fuel enters the air stream within the port itself, it not only burns the port refractories, but the expansion of the oil jet plus the partial combustion thereof which takes place within the port tends to block the port and reduce the volume of preheated air that can pass therethrough to the furnace chamber.

When the fuel is injected into the air stream from below the port, it tends to force the preheated air upwardly toward the furnace roof and away from the surface of the glass. With such an arrangement, the burner blocks and the burners are inaccessible, making it hard to service the same. The burners are also hard to adjust. The burner nozzle is so close to the edge of the tank that the high velocity jet tends to cause a cold spot immediately adjacent the tank side wall.

One object of this invention is to produce an improved regenerative tank type glass melting furnace.

Another object is to produce an improved port structure for such furnaces.

Another object is to produce an improved roof structure for the ports of such furnaces.

A further object is to produce a roof structure for the ports of furnaces of this type, of such design that permits of so positioning the fuel burner nozzle that the liquid fuel projected thereby can be so directed as to avoid objectionable turbulency and local hot spots whereby substantially uniform combustion can be maintained across substantially the full width of the tank.

A further object is to produce an improved suspended roof structure for the ports of a glass melting furnace.

A still further object is to produce a suspended knuckle-like roof for the preheated air ports of a glass melting furnace.

These and other objects which will be apparent to those skilled in this particular art, I attain by means of the structures described in the specification and illustrated in the drawings accompanying and forming part of this application.

In the drawings:

Fig. 2 is a detail sectional view of the port knuckle, a portion of the furnace chamber roof and a portion of the roof for the uptake of the adjacent regenerator. This view is taken on line II—II of Fig. 3 and omits the port pillars and side walls;

Fig. 3 is a top plan view of a portion of the furnace parts illustrated in Fig. 2, but indicates the port pillars or side walls by dot and dash lines;

Fig. 4 is a view looking toward the front of one of the furnace ports and shows the furnace roof in section. This view is taken from line IV—IV of Fig. 3; and Fig. 5 is a sectional view taken on line V—V of Fig. 3.

Figure 1:
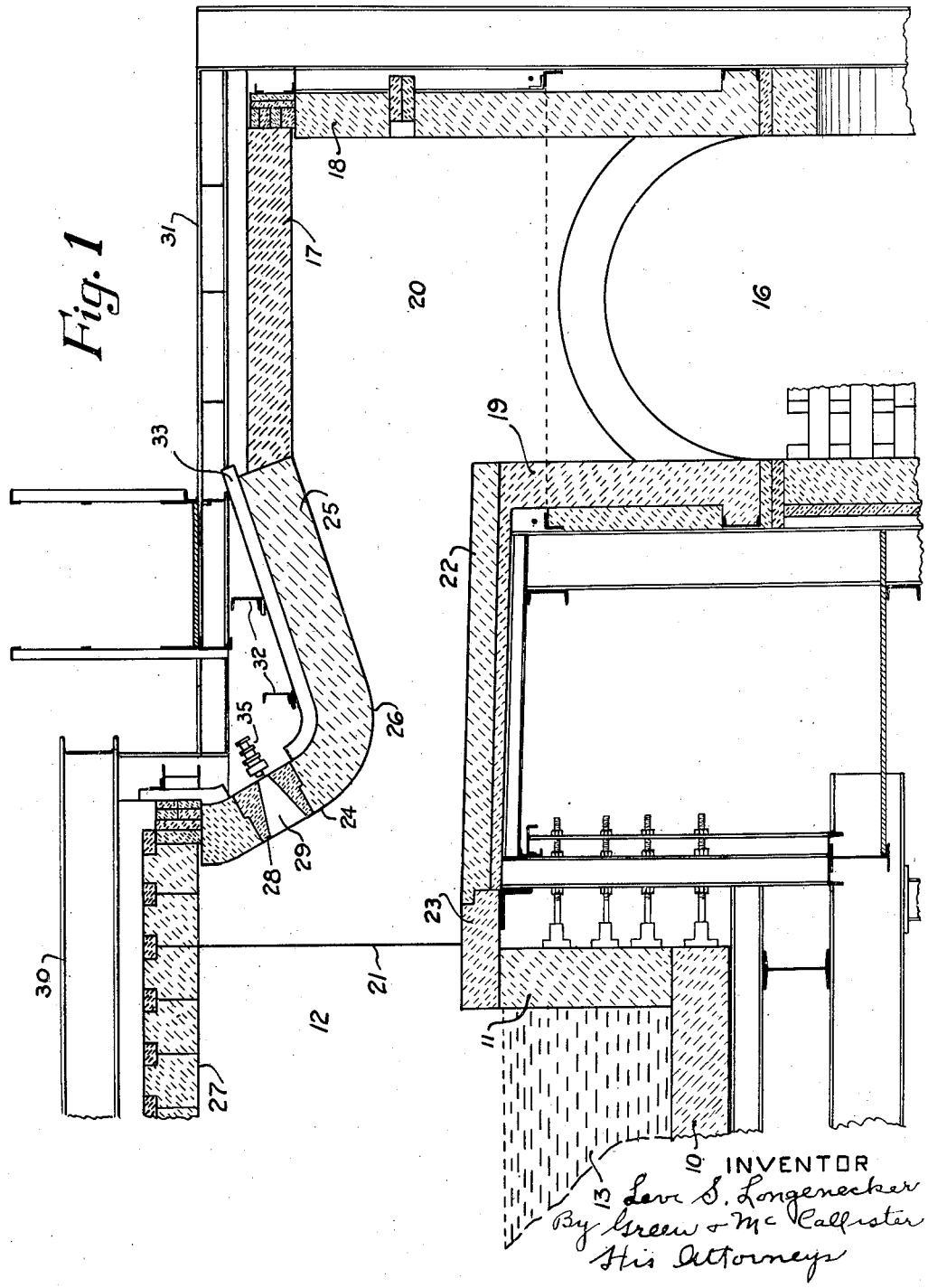
Figure 1 is a fragmentary transverse section of a regenerative, tank type glass melting furnace embodying this invention and is taken through the longitudinal center of one of the furnace ports.

The furnace chosen for the purpose of illustrating my invention, is the same in many respects as the usual regenerative or continuous tank type glass melting furnace, especially in those parts located below the floor line of the furnace ports.

The tank, of which only the bottom 10 and one side wall 11 are shown, is located below the furnace chamber 12 and is adapted to contain a bath 13 of molten glass and batch material.

The side walls of furnace chamber 12 are provided with oppositely positioned ports which serve as inlet ports for preheated air and outlet or outgoing ports for the hot products of combustion as is now common in this type of glass melting furnace. These ports can be of any desired width and of any desired number, and one or more fuel injecting devices can be employed in connection with each such port.

For the purposes of this application, I have disclosed but one furnace port. This is numbered 15 (Fig. 4) and receives preheated air from regenerator 16.

Each regenerator 16 (there being one such regenerator on each side of the furnace) is provided with an uptake for each port 15. Each such uptake is provided with a roof 17, a back wall 18, a front wall 19 and parallel side walls, only one of which is shown in Fig. 1 and is numbered 20. A pair of such walls for port 15 are shown in Fig. 3 by dash lines. Walls 20 extend from back wall 18 of the uptake to the furnace chamber where they terminate in pillars 21 adjacent the mouth of port 15.

A floor or platform 22, formed as a continuation of tank block 23, extends from such block to and across the top of inside wall 19 of the uptake.

Side walls 20 and platform 22 constitute the sides and floor of port 15, while a suspended angular roof knuckle forms the top of the port and constitutes an important part of this invention.

This port roof knuckle which is suspended in position over platform 22 approximates a shallow V when viewed in longitudinal section and comprises legs 24 and 25 which join in a bottom curve portion 26. Leg 24 extends upwardly from portion 26 to roof 27 of the furnace chamber and is provided with one or more burner blocks 28 (only one being shown) each having a conical opening 29 extending therethrough. Leg 25, which forms one wall of the throat of the port, at its rear end joins roof 17 of the uptake.

The knuckle-like roof forms a restricted throat for the port and gives form and velocity to the preheated air stream issuing from the port.

The roof knuckle, the furnace chamber roof and the roof of the uptake are all preferably made of refractory blocks or tile of the type broadly disclosed in my Patent 1,590,303. The furnace chamber roof 27 and the uptake roof 17 are respectively suspended from beams 30 and 31, preferably in the manner disclosed in Patent 2,126,901 issued to me on August 16, 1938. The blocks or tile forming the port roof knuckle are suspended from beams 32 by support members 33 and hangers 34 as disclosed in Patent 2,240,190 issued to me on April 29, 1941.

A high velocity liquid fuel jet projecting device 35 (one for each burner block) is suitably supported within the upper hollow portion of the knuckle so that a jet of liquid fuel projected thereby passes through the opening in its burner block and meets the preheated air stream issuing from port 15 adjacent the tank face of block 23.

While I have shown the roof of the furnace chamber as suspended, it will be apparent that such roof may, if desired, be of the sprung arch type. I prefer to have the port roof knuckle suspended from the furnace superstructure as shown, but it will be apparent that it can be supported from the port side walls by means of beams or other structural members having their ends anchored in such walls.

The port roof knuckle need not necessarily be located in the position shown in Fig. 1. It may be positioned nearer the furnace chamber or further from the furnace chamber. I, however, prefer to place it in about the position shown in Fig. 1, so that the axis of the jet of liquid fuel projected by the burner jet nozzle will met the axis of the air stream at an angle such that objectionable turbulency will not be occasioned.

It will be understood that while the sides of the furnace roof proper terminate at pillars 21, the roof is provided with portions that extend outwardly over the tops of such pillars and the outer ends of such ports as disclosed in Figures 1 and 3.

The port roof knuckle is a self-contained unit, is located between the port side walls and is independent of the furnace chamber roof, whether such roof is of the suspended type as shown herein or is of the sprung arch type.

It will also be apparent that this knuckle can be so positioned longitudinally of the port side walls as to obtain the desired relatively small angle between the axis of the preheated air stream and the axis of the fuel jet, whereby combustion can be initiated at a point relatively close to the tank edge of block 23 without such turbulence or splashing as would tend to cause an intense localized hot spot on the surface of the glass bath.

The furnace, of course, is adapted to be reversed during operation, so that each port 15 not only serves to deliver preheated air to furnace chamber 12, but also serves as an outlet or outgoing port for the hot products of combustion as they leave the furnace chamber on their way to the regenerator when the operation of the furnace has been reversed, as will be understood.

Having thus described my invention, what I claim as new and desire to secure by Letters Patent is:

1. In a regenerative tank type glass melting furnace having a port arranged to discharge a substantially horizontal stream of preheated air across the furnace chamber; such port having a floor, side walls and a refractory knuckle-like roof located between such side walls, approximating a shallow V in longitudinal sectional and forming a restricted throat for such port; the leg of such knuckle adjacent the furnace chamber being provided with a through opening, and a burner nozzle positioned above such knuckle and arranged to project a jet of liquid fuel through such opening and into the preheated air stream as such stream enters the furnace chamber.

2. In a glass melting furnace having a port arranged to discharge a stream of preheated air across the furnace chamber; such port having a floor, side walls and a refractory knuckle-like roof suspended between such walls, forming a restricted throat for such port and provided with a burner opening in that portion thereof adjacent the furnace chamber, and a burner nozzle positioned above such knuckle and arranged to project a jet of liquid fuel through such opening and into the preheated air stream entering the furnace chamber.

3. In a glass melting furnace comprising a heating chamber, a tank below such chamber for containing a bath of molten glass, an air preheating regenerator and a port for discharging a substantially horizontal stream of preheated air derived from such regenerator across such chamber above said tank; said port having a floor, side walls and a knuckle-like roof which approximates a shallow V in longitudinal section and forms a restricted throat for such port such roof in the leg thereof adjacent the furnace chamber having an opening extending therethrough, and a jet projecting device located above such roof and arranged to project a jet of liquid fuel through such opening and into such stream of preheated air as it enters the furnace chamber from such port.

4. In a glass melting furnace comprising a heating chamber, a tank below said chamber for containing a bath of molten glass, an air preheating regenerator and a port for discharging preheated air from such regenerator into and across said chamber above said tank; said port having a floor, side walls and a suspended knuckle-like roof which approximates a shallow V in longitudinal section, forms a restricted throat for such port and which in the leg thereof adjacent the furnace chamber is provided with a burner opening, and a burner nozzle located above such roof and arranged to project a jet of liquid fuel through such opening and into the preheated air entering the furnace chamber from said port.

5. A structure as defined in claim 3, in which the leg of the roof knuckle adjacent the furnace chamber is shorter than the other leg.

6. A structure as defined in claim 4, in which the knuckle-like roof is suspended independently of the furnace chamber roof.

7. A structure as defined in claim 4, in which the knuckle-like roof extends from the furnace chamber roof to the regenerator uptake roof.

8. A structure as defined in claim 4, in which the burner nozzle is positioned within the space between the legs of the knuckle-like roof.

LEVI S. LONGENECKER.

REFERENCES CITED

The following references are of record in the file of this patent:

UNITED STATES PATENTS

| Number | Name | Date |
|---|---|---|
| 1,637,473 | Culbertson | Aug. 2, 1927 |
| 1,653,507 | Pike | Dec. 20, 1927 |
| 1,893,061 | Peiler | Jan. 3, 1933 |
| 2,300,426 | Longenecker | Nov. 3, 1942 |

Certificate of Correction

Patent No. 2,460,514.   February 1, 1949.

LEVI S. LONGENECKER

It is hereby certified that errors appear in the printed specification of the above numbered patent requiring correction as follows:

Column 3, line 72, for the word "met" read *meet*; column 4, line 39, claim 1, for "sectional" read *section*;

and that the said Letters Patent should be read with these corrections therein that the same may conform to the record of the case in the Patent Office.

Signed and sealed this 31st day of May, A. D. 1949.

[SEAL]

THOMAS F. MURPHY,
*Assistant Commissioner of Patents.*